US009380792B2

United States Patent
Lagares Cominas

(10) Patent No.: US 9,380,792 B2
(45) Date of Patent: Jul. 5, 2016

(54) MACHINE FOR PROCESSING A MEAT MASS

(71) Applicant: METALQUIMIA, SA, Girona (ES)

(72) Inventor: Narcís Lagares Corominas, Besalú (ES)

(73) Assignee: Metalquimia, S.A. (ES)

( * ) Notice: Subject to any disclaimer, the term of this patent is extended or adjusted under 35 U.S.C. 154(b) by 0 days.

(21) Appl. No.: 14/783,127

(22) PCT Filed: Jan. 28, 2014

(86) PCT No.: PCT/IB2014/000080
§ 371 (c)(1),
(2) Date: Oct. 8, 2015

(87) PCT Pub. No.: WO2014/174349
PCT Pub. Date: Oct. 30, 2014

(65) Prior Publication Data
US 2016/0044930 A1    Feb. 18, 2016

(30) Foreign Application Priority Data

Apr. 26, 2013   (EP) ..................................... 13380017

(51) Int. Cl.
*A22C 9/00*   (2006.01)

(52) U.S. Cl.
CPC ..................................... *A22C 9/005* (2013.01)

(58) Field of Classification Search
CPC .......... A22C 9/00; A22C 9/004; A22C 9/005; A22C 9/007; A22C 17/00; A22C 17/004
USPC .......... 452/7, 10, 141–143; 99/535, 532, 348, 99/345, 407
See application file for complete search history.

(56) References Cited

U.S. PATENT DOCUMENTS

| | | | | |
|---|---|---|---|---|
| 3,855,668 A | * | 12/1974 | Wenstrom | A22C 29/00 452/7 |
| 4,255,834 A | * | 3/1981 | Lambert | A22C 29/046 452/14 |
| 4,791,705 A | * | 12/1988 | Corominas | A22C 9/005 100/910 |
| 4,815,165 A | * | 3/1989 | Gibson | A22C 9/004 452/141 |
| 4,836,099 A | | 6/1989 | Thirode | |
| 5,492,499 A | * | 2/1996 | Van Haren | A22C 9/005 366/337 |

(Continued)

FOREIGN PATENT DOCUMENTS

| EP | 0643918 A1 | 3/1995 |
|---|---|---|
| EP | 1082905 A1 | 3/2001 |

(Continued)

*Primary Examiner* — Richard Price, Jr.
(74) *Attorney, Agent, or Firm* — Hess Patent Law Firm LLC; Robert J. Hess

(57) ABSTRACT

A machine for processing a meat mass that includes a rotary drum (10) for containing a meat mass with an open front end (14) with a lid (40) for loading and unloading, a closed rear end (13), inner blades for driving and turning over the meat mass during rotation, a support chassis (20) supporting the rotary drum such that it can rotate about a rotational shaft, a support base (30) to which the support chassis is articulated by a shaft perpendicular to the rotational shaft and close to the front end (14) of the rotary drum, adjustable inclination mechanism for moving the rear end of the support chassis height-wise in order to change the inclination of the rotary drum, and a vibration damper associated with a rear part of the support chassis adjacent to the rear end (13) of the rotary drum.

14 Claims, 4 Drawing Sheets

(56) References Cited

U.S. PATENT DOCUMENTS

| | | | | |
|---|---|---|---|---|
| 5,514,030 A * | 5/1996 | Suhner | A22C 9/005 426/281 |
| 5,775,986 A * | 7/1998 | Law | A22C 9/005 366/294 |
| 5,928,072 A * | 7/1999 | Fulcher | A22C 29/025 452/1 |
| 5,947,015 A * | 9/1999 | Laurbak | A22C 9/004 366/139 |
| 6,007,418 A * | 12/1999 | Suhner | A23B 4/26 366/131 |
| 6,347,986 B1 * | 2/2002 | Fujii | A22C 25/14 452/135 |
| 6,595,846 B1 * | 7/2003 | Lagares Corominas | A22C 9/005 452/141 |
| 7,987,771 B2 * | 8/2011 | Duineveld | A47J 31/407 210/121 |

FOREIGN PATENT DOCUMENTS

| | | |
|---|---|---|
| ES | 2207217 T3 | 5/2004 |
| WO | WO 2014/174349 A1 | 10/2014 |

* cited by examiner

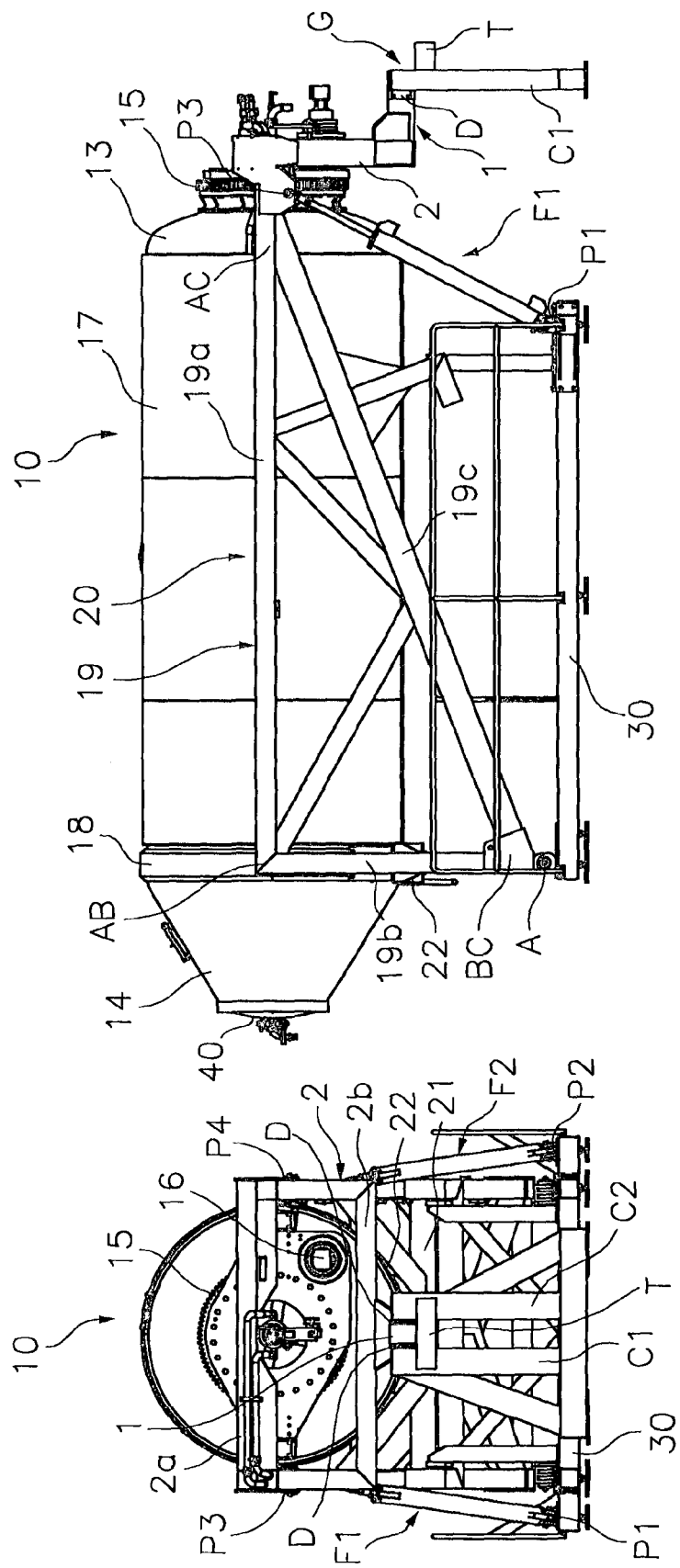

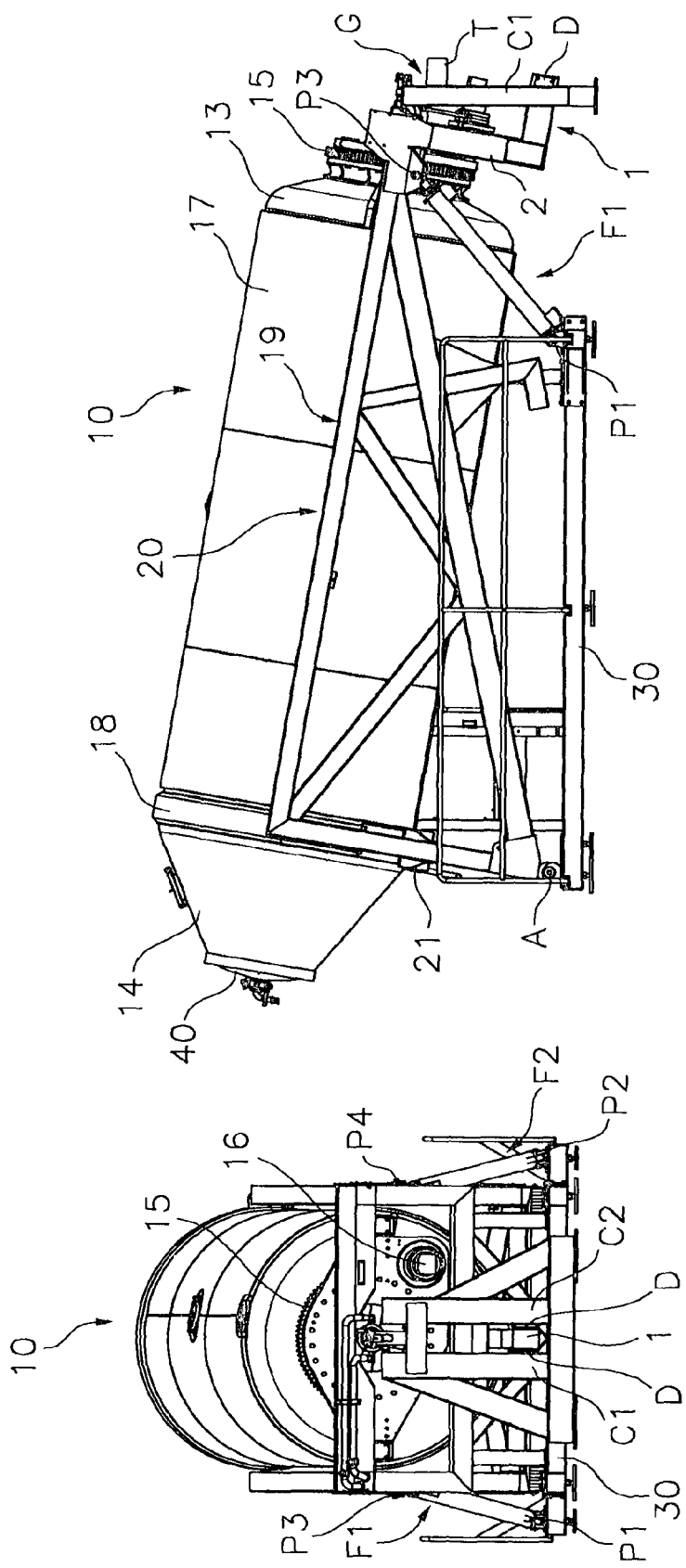

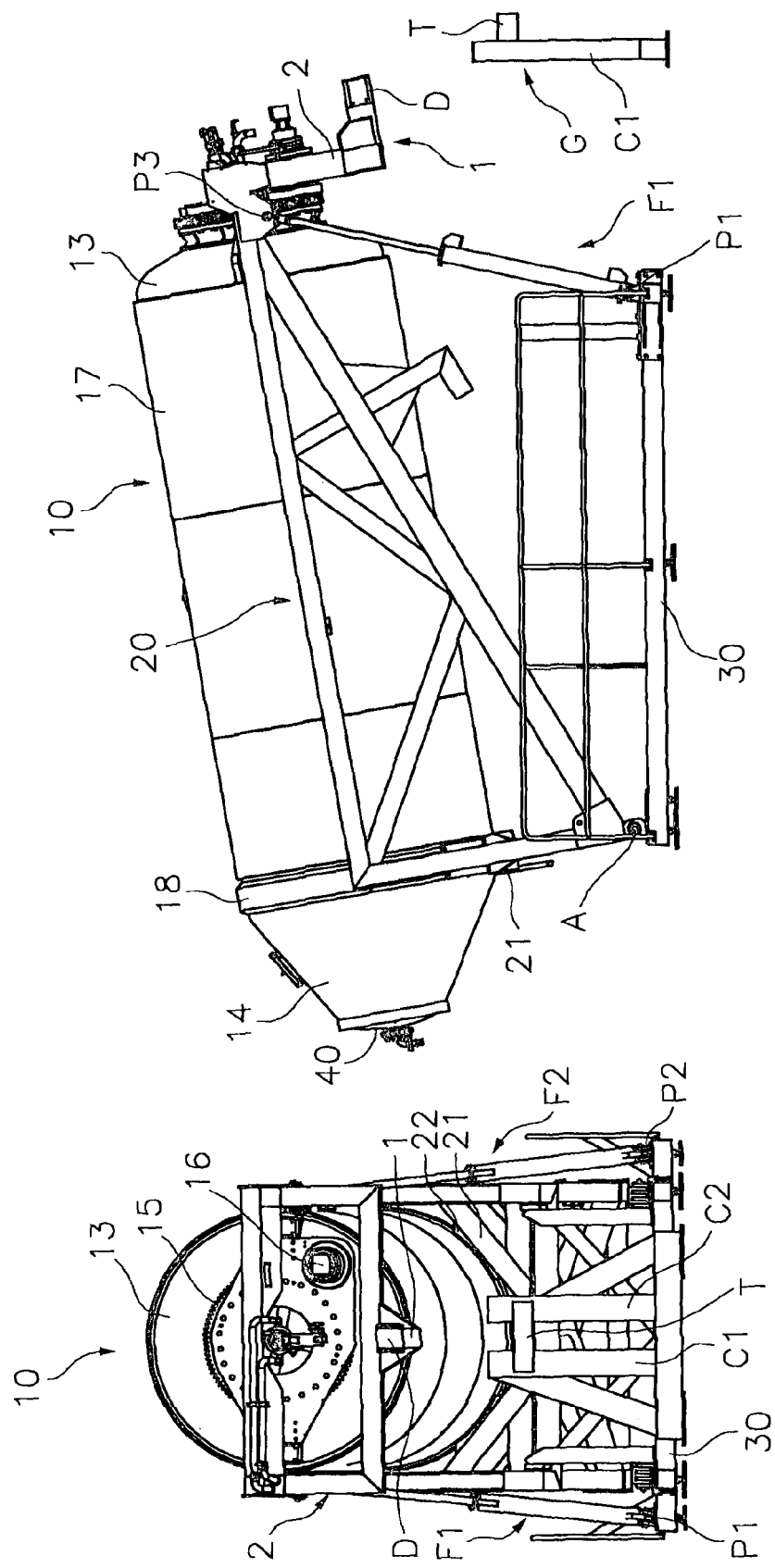

MACHINE FOR PROCESSING A MEAT MASS

FIELD OF THE ART

The present invention generally relates to a machine for processing a meat mass comprising a rotary drum supported by a support chassis which is adjustable heightwise in order to change the inclination of the rotary drum, and where the processing of the meat mass is carried out by the inner blades of the drum driving and turning over the meat mass, and more particularly to a machine comprising means for damping the vibrations produced in the support chassis when the rotary drum rotates.

Speeding up the manufacturing processes to achieve more continuous flows has always been sought in the meat industry. In the specific case of cooked ham and cold cuts, it can be observed how the meat maturation processes both of fresh meat and of uncooked meat have been reduced in recent years, and in this latter case the process is sometimes even completely eliminated.

These changes along with an increase in PSE (pale soft exudative) incidence in the end product have required performing stronger meat tenderizations and even a double tenderization, and they have also generally required prolonging kneading times.

PRIOR STATE OF THE ART

Some meat machinery manufacturers have responded to the mentioned trend by adapting kneading machines to the preparation of cooked ham and cold cuts, which allows achieving a significant reduction in kneading times. However, even though this equipment has conventionally been used for preparing very high yield minced products with a large amount of starch and solids, the use thereof in whole muscle products is not a widespread practice due to the diced appearance and the amount of intermuscular paste they confer to the end product.

Patent EP1082905B1 discloses a machine for processing a meat mass, particularly meat pieces.

Such machine is generally used for macerating and treating meat pieces or blocks such as cured ham, fresh meat or other meat products which in many cases have been previously injected with brine or another preserving or improving product, the processing of which comprises kneading actions by rubbing the meat pieces with one another and with the walls and alternatively strongly knocking the meat pieces which, for such purpose, are lifted and left to fall from a certain height on the rest of the meat mass.

The weight of the meat mass to be processed in machines of this class together with the weight of the drum itself easily exceeds five tons, which greatly limits the maximum rotational speed to be achieved due to the high centrifugal force which is generated when the drum rotates and which is translated into vibrations transmitted to the support chassis of the drum. This limits the class of end product obtained to whole muscle products or the like.

The present inventors are not aware of any such machine (i.e., envisaged for processing several tons of meat mass) which allows achieving such high rotational speeds (of the order of 24 rpm) so as to successfully produce a fine meat paste or emulsion by processing the meat mass.

DISCLOSURE OF THE INVENTION

It is necessary to offer an alternative to the state of the art which allows covering the drawbacks found therein by providing a machine of the type indicated above which allows processing the meat mass at higher speeds than those allowed by known machines.

For such purpose, the present invention proposes as a solution for reducing kneading times a machine for processing a meat mass in a drum of the mentioned type, having a high mechanical efficiency, capable of rotating up to 24 rpm, which allows making high yield hams, cold cuts in much shorter kneading times, in addition to reducing or even (according to the meat product) eliminating the need to leave the meat to stand before cooking without having to forgo a whole muscle appearance of the product, or the versatility offered by a kneading drum.

For such purpose, the present invention provides a machine for processing a meat mass comprising in an already known manner a rotary drum with an open front end for loading and unloading a meat mass and provided with a lid, a closed rear end, inner blades for driving and turning over the meat mass during the rotation of the rotary drum, a support chassis supporting said rotary drum such that it can rotate about an rotational shaft, a support base to which said support chassis is articulated by a shaft perpendicular to the rotational shaft and close to said front end of the rotary drum and adjustable inclination means for moving the rear end of said support chassis heightwise in order to change the inclination of the rotary drum.

Unlike the known proposals, the machine proposed by the present invention comprises vibration damping means envisaged for damping the vibrations produced in the support chassis when the rotary drum rotates.

According to a preferred embodiment, the vibration damping means are associated with a rear part of the support chassis adjacent to the rear end of the rotary drum, although for other alternative embodiments or embodiments complementary to the preferred embodiment, the vibration damping means are associated with other parts of the support chassis.

The vibration damping means are configured and arranged for damping the vibrations produced in the support chassis when the rotary drum is loaded with a meat mass of between 500 kg and 10,000 kg and rotates at a maximum tangential velocity in the inner diameter of the rotary cylinder comprised between 1.25 m/s and 2 m/s, this maximum tangential velocity being the result of rotating a drum of about 1.90 m in diameter at about 20 rpm.

According to one embodiment, the vibration damping means are configured and arranged to allow the heightwise movement of the rear end of the support chassis and therefore of the rear end of the rotary drum supported by same, without interfering in the path thereof.

According to one embodiment, the vibration damping means comprise at least:
- one arm fixed to a rear part of the support chassis, which part supports the rear end of the rotary drum, and
- one fixed guiding and retaining structure arranged and configured for guiding a distal end of the arm in the path it follows during said heightwise movement and for retaining same in a direction transverse to that of said path.

For one variant of said embodiment, said fixed guiding and retaining structure comprises respective rigid columns fixed by one end to a support surface, such as the ground, such that both rigid columns run transversely from said support surface, parallel to one another, and are separated by a predetermined distance allowing the passage of the distal end of the arm between them.

The fixed guiding and retaining structure optionally comprises a crossbar attaching both rigid columns to one another at a certain height without interfering in the passage of the arm in order to confer greater structural strength to the assembly formed by the two columns, thus withstanding greater vibration.

According to one embodiment, the rigid columns run perpendicular to the plane defined by the support surface.

The support base is also generally fixed to said support surface, such as the ground.

According to one embodiment, the vibration damping means also comprise vibration absorbing elements, such as elastic elements arranged at least on the sides of the distal end of the arm which contact the fixed guiding and retaining structure.

The distal end of the arm and the vibration absorbing elements are arranged and configured to be tightly fitted between said two rigid columns allowing the mentioned heightwise movement.

According to one embodiment, the vibration damping means also comprise a support body to which the mentioned arm is fixed, and which body is in turn fixed to the rear part of the support chassis.

According to one embodiment, the adjustable inclination means comprise at least two fluid dynamic cylinders arranged on both sides of the rotary drum with first ends fixed to respective points of the support base and seconds ends fixed to respective points of the rear part of the support chassis, the fluid dynamic cylinders running according to a direction converging towards their seconds ends such that they are separated by a distance less than the distance separating the first ends, said converging arrangement (i.e., an inverted V-shaped arrangement) of the fluid dynamic cylinders also making them part of the vibration damping means since they confer a resistance to the transverse components of the vibration forces transmitted to the support chassis by the rotary drum that is greater than that conferred by the arrangement proposed in ES2207217T3 in which the first ends and the seconds ends of the fluid dynamic cylinders are separated from one another by a substantially equal distance.

For one embodiment, the machine comprises adjustment means for adjusting the rotational speed of the rotary drum which allow selecting different rotational speeds, up to at least 20 rpm, depending on the end product to be obtained after processing.

BRIEF DESCRIPTION OF THE DRAWINGS

The foregoing and other advantages and features will be better understood based on the following detailed description of several embodiments in reference to the attached drawings which must be interpreted in an illustrative and non-limiting manner, in which:

FIG. 1 is a side elevational view of the machine proposed by the present invention for one embodiment with the rotary drum located in a horizontal position corresponding to the working position;

FIG. 2 is a rear elevational view of the machine proposed by the present invention for the same situation illustrated in FIG. 1;

FIGS. 3 and 4 are views similar to FIGS. 1 and 2, respectively, but for a situation where the rotary drum adopts an inclined position with respect to the support base, corresponding to the loading position;

FIGS. 5 and 6 are views similar to FIGS. 1 and 2, respectively, but for a situation where the rotary drum adopts an inclined position with respect to the support base, corresponding to the unloading position.

DETAILED DESCRIPTION OF SEVERAL EMBODIMENTS

Figure 7:
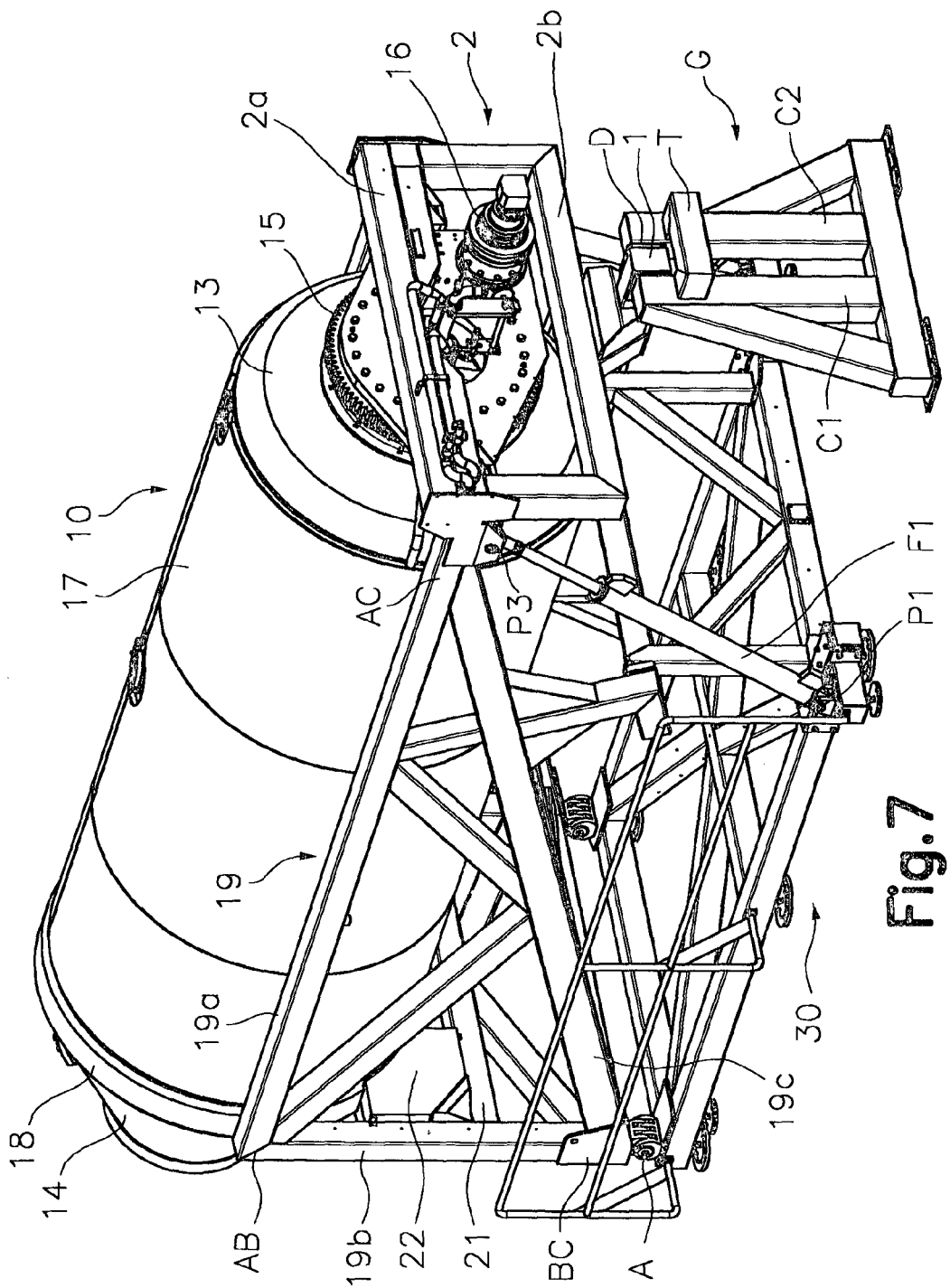
FIG. 7 is an axonometric view of the machine proposed by the present invention located in a working position.

The attached drawings show how according to a preferred embodiment the machine proposed by the present invention comprises a rotary drum 10, a support chassis 20, a support base 30, a fixed guiding and retaining structure G, and two fluid dynamic cylinders F1, F2.

The rotary drum 10 includes a frustoconical front end 14 provided with an opening with a leak-tight lid 40 for loading and unloading a meat mass, a central cylindrical section 17 with a circumferential rotation track 18 at its front end, and a closed rear end 13 provided on its outer face with a cogwheel 15 on which operating means 16 act, said rotary drum 10 internally having a plurality of fixed inner blades (not illustrated) which allow driving, turning over and emulsifying the meat mass during the rotation of the rotary drum 10. Said rotary drum 10 can rotate in a loading position (FIG. 4), the front end 14 being above the rear end 13, in a working position (FIG. 2), the rotational shaft being horizontal, or in an unloading position (FIG. 6), the front end 14 being below the rear end 13.

The support chassis 20 is symmetrical with respect to a vertical plane containing the rotational shaft and comprises a rear quadrilateral 2, a front support 21, and two symmetrical triangular structures 19 arranged on both sides of the rotary drum 10.

The front support 21 supports the front part of the rotary drum 10 by interposed rollers 22 that support and guide the rotary drum 10, allowing its rotation and preventing its axial movement. Said front support 21 is in a plane perpendicular to the rotational shaft and coinciding with the plane where the rotation track 18 is located, and it protrudes symmetrically on both sides of the rotary drum 10.

The rear quadrilateral 2 supports the rear end 13 of the rotary drum 10 by its shaft and has four bars attached at the ends thereof at right angles forming a quadrilateral. The rear quadrilateral 2 is in a plane perpendicular to the rotational shaft of the rotary drum 10, and behind its rear end 13, and both the upper bar of the quadrilateral 2a and the lower bar of the quadrilateral 2b are parallel to the ground. The center of the rear end 13 is attached by bearings to the center of the upper bar of the quadrilateral 2a such that its rotation is allowed but its axial movement is prevented.

The triangular structure 19 includes an upper bar 19a parallel to the rotational shaft of the rotary drum 10, a front bar 19b perpendicular to said upper bar 19a, and an inclined lower bar 19c. These three bars are attached by their ends in one and the same vertical plane parallel to the rotational shaft of the rotary drum 10, forming a right triangle, with a rear vertex AC, a lower vertex BC, and a front vertex AB. Said right triangle inscribes other reinforcement bars of said triangular structure 19. Said lower vertex BC is articulated with respect to the support base 30 by a shaft A close to the ground, perpendicular to the rotational shaft and located in the front half of the rotary drum 10. Said rear vertex AC of each of the triangular structures 19 is attached to the rear quadrilateral 2 by the end of the upper bar of the quadrilateral 2a. Furthermore, said front support 21 is attached by its two ends to the two front bars 19b of the two triangular structures 19. The attachment of the rear quadrilateral 2, the two triangular structures 19, and the front support 21 form said support chassis 20, which partially surrounds the rotary drum 10 and supports it, and allows its rotation and its inclination with respect to the shaft A operating the adjustable inclination means formed by fluid dynamic cylinders F1, F2, and envisaged for moving the rear end of the support chassis 20 height-wise in order to change the inclination of the rotary drum 10.

The mentioned support base 30 on which the support chassis 20 is articulated has a substantially horizontal frame of very little height, supported and fixed on the ground.

Particularly in FIGS. 1 and 3, it can be seen how in the rear half of said support base 30 the two fluid dynamic cylinders F1 and F2 are arranged symmetrically on both sides of the rotary drum 10 and have first ends fixed to respective points P1, P2 of the support base 30 and second ends fixed to respective points P3, P4 in a position close to the vertices AC of the two triangular structures 19, the fluid dynamic cylinders F1, F2 running according to a direction converging towards their seconds ends such that they are separated by a distance less than the distance separating the first ends.

As a non-limiting example, the machine proposed by the present invention can treat an amount of meat mass in a range ranging from batches of 500 kg, by a rotary drum in an embodiment having an inner diameter of 1.2 m, up to batches of 10,000 kg by a rotary drum having an inner diameter of 1.9 m, being able to treat batches of intermediate amounts of 2,700 kg, 3,600 kg, 6,300 kg, 8,100 kg of meat mass by rotary drums 10 in embodiments having inner diameters of 1.4 m, 1.5 m, 1.7 m, 1.8 m, respectively. Furthermore, all these embodiments will be prepared to enable treating the meat mass at high rotational speeds of up to 20 rpm, producing maximum tangential velocities in the inner diameter ranging from 1.25 m/s in the case of the drum having an inner diameter of 1.2 m, up to 2 m/s in the case of the rotary drum having an inner diameter of 1.9 m, thus allowing turning over and emulsifying the meat mass.

The high rotational speeds and the large amount of meat mass produce vibrations in the rotary drum 10 which are transmitted to the support chassis 20. Said support chassis 20 is attached to the support base 30 by its front end by the lower vertices BC sized accordingly, but its rear end requires additional vibration damping means which, for the illustrated embodiment, are associated with a rear part of the support chassis 20 adjacent to the rear end 13 of the rotary drum 10 and comprise the previously mentioned fluid dynamic cylinders F1 and F2, an arm 1, a fixed guiding and retaining structure G, and elastic vibration absorbing elements D.

The vertical component of the vibration is absorbed by the fluid dynamic cylinders F1 and F2 which in turn, as a result of their converging paths, also absorb part of the horizontal component of said vibration.

Most of the horizontal component of the vibration is transmitted by the arm 1 and absorbed by a fixed guiding and retaining structure G arranged and configured for guiding a distal end of the arm 1 in the path it follows during the height-wise movement thereof and for retaining same in a direction transverse to that of said path.

Said arm 1 is fixed to the center of the lower bar of the quadrilateral 2b, which is part of the rear quadrilateral 2 supporting the rear end 13 of the rotary drum 10. Said arm 1 projects perpendicular to the plane of the rear quadrilateral 2 and in a direction opposite the rotary drum 10.

The fixed guiding and retaining structure G comprises respective rigid columns C1, C2 fixed by one end to a support surface, such that both rigid columns C1, C2 run transversely from said support surface, parallel to one another, and perpendicular to the plane defined by the support surface (such as the ground), and are separated by a predetermined distance allowing the passage of the distal end of the arm 1 between them.

The fixed guiding and retaining structure comprises a crossbar T attaching both rigid columns C1, C2 to one another at a certain height without interfering in the passage of the arm 1.

The vibration damping means also comprise elastic vibration absorbing elements D in the form of elastic plates D fixed to the sides of the distal end of the arm 1 which contact the rigid columns C1, C2, the distal end of the arm 1 and the vibration absorbing elements D being arranged and configured to be tightly fitted between the two rigid columns C1, C2 allowing the mentioned height-wise movement.

A person skilled in the art could introduce changes and modifications in the embodiments described without departing from the scope of the invention as it is defined in the attached claims.

The invention claimed is:

1. A machine for processing a meat mass, comprising:
a rotary drum with an open front end for loading and unloading a meat mass and provided with a lid;
a closed rear end;
inner blades driving and turning over the meat mass during the rotation of the rotary drum;
a support chassis supporting said rotary drum, which is rotated about a rotational shaft;
a support base to which said support chassis is articulated by a shaft perpendicular to the rotational shaft and close to said front end of the rotary drum;
adjustable inclination means for moving the rear end of said support chassis to effect a height-wise movement in order to change an inclination of the rotary drum in loading and unloading steps, said inclination means comprising two fluid dynamic cylinders arranged on both sides of said rotary drum with first ends fixed to respective points of the support base and second ends fixed to respective points of the rear part of the support chassis, and
vibration damping means which dampen the vibrations produced in the support chassis when said rotary drum rotates, said vibration damping means being associated with a rear part of said support chassis adjacent to the rear end of the rotary drum and comprising said two fluid dynamic cylinders which absorb a vertical component of the vibration,
wherein the damping means further comprise:
an arm fixed to a rear part of said support chassis supporting said rear end of the rotary drum, and a fixed guiding and retaining structure firmly anchored to ground and arranged and configured for guiding a distal end of said arm in a path followed during said height-wise movement and for retaining the arm in a direction transverse to that of said path absorbing a horizontal component of the vibration.

2. The machine for processing a meat mass according to claim 1, wherein the rotary drum comprises a container with a cylindrical portion having an inner diameter, a closed rear end, and a frustoconical front portion converging in said front end, with an opening provided with said lid.

3. The machine for processing a meat mass according to claim 1, wherein said rotary drum rotates at a tangential velocity in said inner diameter comprised between 1.25 m/s in case of loading about 500 kg of meat mass in a rotary drum having a maximum inner diameter of 1.2 m, and between 1.4 to 2.4 m/s in case of loading about 10,000 kg of meat mass in a rotary drum having a maximum inner diameter of 1.9 m.

4. The machine according to claim 1, wherein said vibration damping means are configured and arranged to allow said height-wise movement of the arm attached to the rear quadrilateral of the support chassis and therefore of the rear end of the rotary drum supported by same, without interfering in a path thereof.

5. The machine according to claim 1, wherein said fixed guiding and retaining structure comprises respective rigid columns fixed by one end to a support surface, such that both rigid columns run transversely from said support surface, parallel to one another, and are separated by a predetermined distance allowing the passage of the distal end of the arm between them.

6. The machine according to claim 5, wherein the fixed guiding and retaining structure comprises a crossbar attaching both rigid columns to one another at a certain height without interfering in the passage of the arm.

7. The machine according to claim 5, wherein said rigid columns run perpendicular to the plane defined by said support surface.

8. The machine according to claim 7, wherein the support base is also fixed to said support surface.

9. The machine according to claim 5, wherein the vibration damping means also comprise vibration absorbing elements provided by elastic elements fixed to sides of the distal end of the arm and said vibration absorbing elements are arranged and configured to be tightly fitted between said two rigid columns allowing the height-wise movement.

10. The machine according to claim 1, wherein the vibration damping means also comprise vibration absorbing elements arranged at least on the sides of said distal end of the arm which contact said fixed guiding and retaining structure.

11. The machine according to claim 10, wherein said vibration absorbing elements are elastic elements fixed to said sides of the distal end of the arm.

12. The machine according to claim 1, wherein the vibration damping means also comprise a support body to which said arm is fixed, and said support body is in turn fixed to said rear part of the support chassis.

13. The machine according to claim 1, wherein said fluid dynamic cylinders are arranged in directions converging towards their seconds ends such that the second ends are separated by a distance less than the distance separating the first ends, said converging arrangement of the fluid dynamic cylinders making them to absorb part of the horizontal component of the vibration.

14. The machine according to claim 1, wherein
the rotary drum has different selectable rotational speeds, up to at least 24 rpm, depending on the end product to be obtained after processing.

* * * * *